United States Patent
Hyakumura

[11] 4,192,579
[45] Mar. 11, 1980

[54] BEHIND-STOP TYPE LENS SYSTEM FOR PHOTOGRAPHIC CAMERAS

[75] Inventor: Kazushi Hyakumura, Hachiouji, Japan

[73] Assignee: Olympus Optical Company Limited, Toyoto, Japan

[21] Appl. No.: 873,499

[22] Filed: Jan. 30, 1978

[30] Foreign Application Priority Data

Feb. 8, 1977 [JP] Japan .................. 52-12693

[51] Int. Cl.$^2$ ............................................. G02B 9/20
[52] U.S. Cl. .................................................. 350/227
[58] Field of Search ........................................ 350/227

[56] References Cited
U.S. PATENT DOCUMENTS

| | | | |
|---|---|---|---|
| 2,158,178 | 5/1939 | Frederick et al. | 350/227 |
| 2,165,328 | 7/1939 | Aklin et al. | 350/227 |
| 3,953,112 | 4/1976 | Imai | 350/227 |

FOREIGN PATENT DOCUMENTS

| | | | |
|---|---|---|---|
| 314696 | 6/1956 | Switzerland | 350/227 |
| 649218 | 1/1951 | United Kingdom | 350/227 |

*Primary Examiner*—Conrad J. Clark
*Attorney, Agent, or Firm*—Cushman, Darby & Cushman

[57] ABSTRACT

A lens system for photographic cameras which has a very short total length and wherein aberrations are favorably corrected. Said lens system comprises a first positive meniscus lens component, a second biconcave lens component and a third cemented doublet component, and said lens system satisfying the conditions enumerated hereunder:

(1) $0.23f < \Sigma d < 0.3f$
(2) $0.55f < f_1 < 0.59f$
(3) $-0.37f < f_2 < -0.32f$
(4) $n_1 > 1.71$
(5) $n_2 < 1.67$
(6) $|r_7| > 4.8f$
(7) $0.26f < -r_6 < 0.34f$
(8) $|r_3|/r_4 > 6.0$
(9) $\nu_1 - \nu_2 > 14$

8 Claims, 8 Drawing Figures

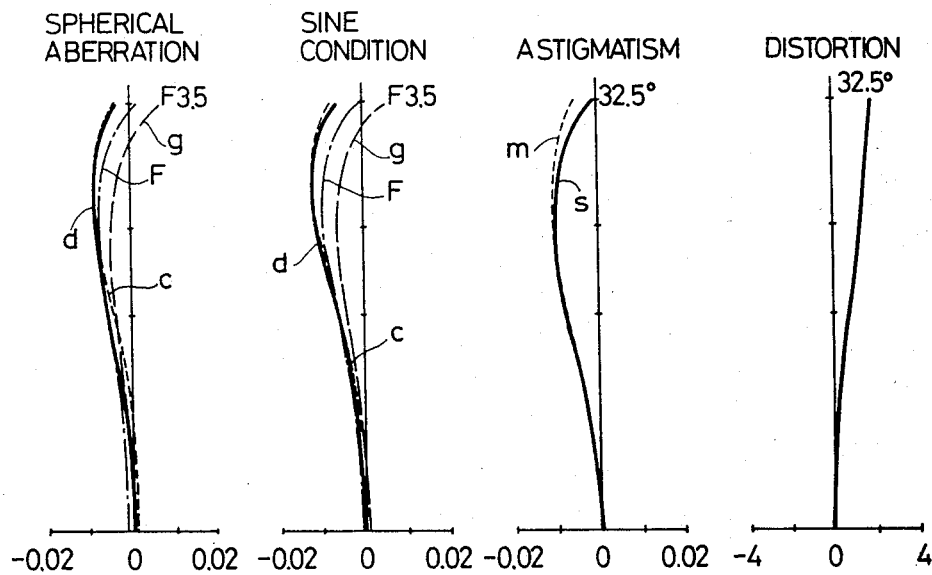
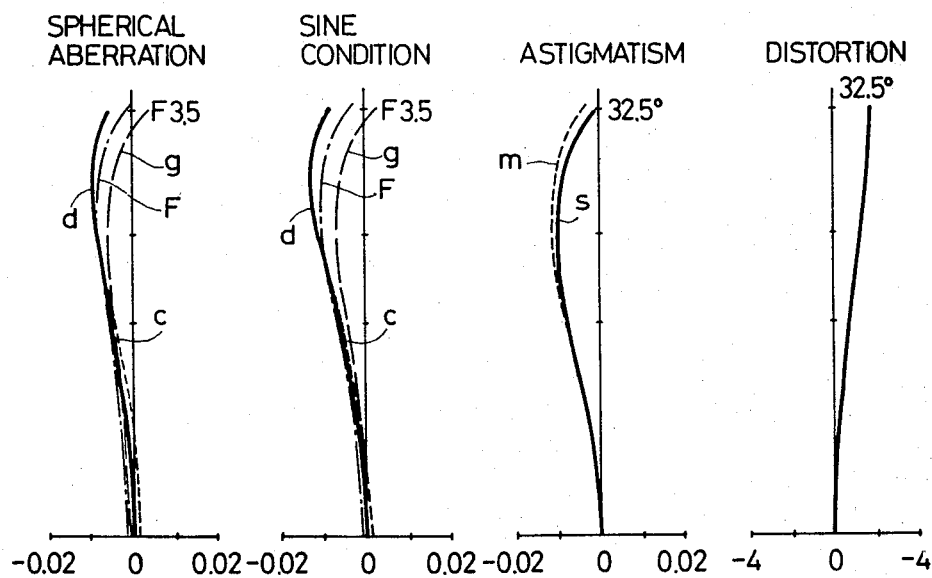

BEHIND-STOP TYPE LENS SYSTEM FOR PHOTOGRAPHIC CAMERAS

BACKGROUND OF THE INVENTION (a) Field of the Invention

The present invention relates to a behind-stop type lens system having a short total length and a large field angle to be used with compact type photographic cameras.

(b) Description of the Prior Art

Conventional behind-stop type lens systems for use with photographic cameras had long total lengths, telephoto ratios of 1.15~1.20 and half field angles of 30° or narrower.

SUMMARY OF THE INVENTION

A general object of the present invention is to provide a very compact Tessar type wide-angle lens system which have a telephoto ratio of approx. 1.06, a half field angle of 32°~34° and an aperture ratio of about F/3.5 and wherein various aberrations are favorably corrected.

The lens system according to the present invention is so composed as shown in FIG. 1. This is to say, said lens system comprises a first positive meniscus lens component having a convex surface on the object side, a second biconcave lens component and a third cemented doublet component consisting of a biconvex lens element and a negative lens element. The lens system according to the present invention is characterized in that it satisfies the conditions enumerated below:

(1) $0.23f < \Sigma d < 0.3f$
(2) $0.55f < f_1 < 0.59f$
(3) $-0.37f < f_2 < -0.32f$
(4) $n_1 > 1.71$
(5) $n_2 < 1.67$
(6) $|r_7| > 4.8f$
(7) $0.26f < -r_6 < 0.34f$
(8) $|r_3|/r_4 > 6.0$
(9) $\nu_1 - \nu_2 > 14$ wherein the reference symbols represent as defined hereunder:

$\Sigma d$: total length of the lens system as a whole $f_1$ and $f_2$: focal lengths of the first and second lens components respectively $f$: focal length of the lens system as a whole $n_1$ and $n_2$: refractive indices of the first and second lens components respectively $\nu_1$ and $\nu_2$: Abbe's numbers of the first and second lens components respectively $r_3$, $r_4$, $r_6$ and $r_7$: radii of curvature on both the surfaces of the second lens component, cemented surface and image side surface of the third lens component Now, the significance of the above-mentioned conditions will be described detailedly below. A behind-stop type lens system designed for a large field angle should desirably have a short total length $\Sigma d$ for the purpose of assuring sufficient marginal rays. If total length $\Sigma d$ is long, quantity of lower rays will be far smaller than that of upper rays at marginal portion of the field angle, thereby being disadvantageous for maintaining symmetry. For the reason described above, the condition (1) defines total length $\Sigma d$ within a range of $\Sigma d < 0.3f$. If $\Sigma d$ exceeds the upper limit of the condition (1), quantity of marginal rays will be insufficient, thereby making it impossible to maintain good symmetry between the upper and lower rays. If $\Sigma d$ is smaller than the lower limit of the condition (1), in contrast, it will be difficult to design a behind-stop type lens system having a wide field angle.

In such a photographic lens system designed for medium brightness and a wide field angle as is provided by the present invention, it is necessary to correct astigmatism and curvature of field more favorably than spherical aberration. For this purpose, the focal length $f_1$ of the first lens component and the focal length $f_2$ of the second lens component are so selected as to satisfy the conditions (2) are (3) in addition to the condition (1) already described above. Simultaneously, the refractive indices $n_1$ and $n_2$ of the first and second lens components are so selected as to satisfy the conditions (4) and (5) for the purpose of controlling spherical aberration as small as possible and minimizing Petzval's sum. If focal length $f_1$ is larger than $0.59f$ in the condition (2), rays incident on the second diverging lens component will be too high, thereby making it impossible to minimize the telephoto ratio. In order to lower the rays incident on the second lens component, it will be necessary to increase airspace $d_2$ between the first and second lens component, but such measure will make it impossible to satisfy the condition (1). If $f_1$ is smaller than $0.55f$, remarkable spherical aberration will be produced by the first lens component and, in addition, Petzval's sum will be large. When the focal length $f_2$ is larger than $-0.32f$ in the condition (3), rays incident on the third converging lens component will be too high, thereby making the telephoto ratio too large or making it necessary to displace the third lens component too close to the second lens component to be impracticable in actual designing of the lens system. When the focal length $f_2$ is smaller than $-0.37f$ in the condition (3), rays incident on the third converging lens component will be too low. In such a case, it will be necessary to displace the third lens component to the image side for obtaining the desired telephoto ratio, but such displacement will make both the total length $\Sigma d$ and Petzval's sum too large respectively. Furthermore, the refractive indices $n_1$ and $n_2$ deviating from the ranges defined by the conditions (4) and (5) will make Petzval's sum too large. Similarly, radii of curvature on the image side surface and cemented surface of the third lens component must be selected within the ranges specified by the conditions (6) and (7) respectively for favorably correcting astigmatism. That is to say, the lens system according to the present invention is designed in such a manner that astigmatism produced on the image side surface of the second lens component will be corrected consecutively and gradually by the surfaces ($r_5$, $r_6$ and $r_7$) of the third lens component. If $r_7$ has a negative value deviating from the range defined by the condition (6), astigmatism produced by surface $r_7$ will be too remarkable, resulting in overcorrection in the lens system as a whole. When $r_7$ has a negative value deviating from the range defined by the condition (6), the radius of curvature $|r_6|$ on the cemented surface must be small for the purpose of maintaining a constant power for the negative lens element located on the image side in the third lens component. However, a cemented surface having such a radius of curvature will remarkably aggravate astigmatism, thereby resulting in overcorrection of astigmatism in the lens system as a whole. If radius of curvature $r_7$ has a positive value deviating from the range defined by the condition (6), the surface $r_7$ will produce astigmatism which is inverse to that produced by the surfaces $r_5$ and $r_6$, thereby resulting in undercorrection of astigmatism in the lens system as a whole. If it is attempted to correct this astigmatism by the surfaces $r_5$ and $r_6$, correction degree will be high enough on these surface to produce high order aberrations, thereby making it impossible to favorably correct aberrations over the wide field angle.

Further, the cemented surface of the third lens component has a convex surface on the image side, unlike the ordinary Tessar type, and is so designed as to satisfy the condition (7) for assuring good symmetry between the upper and lower rays. If $-r_6$ is larger than 0.34f in the condition (7), as astigmatism will be undercorrected and image plane will be curved toward the positive side, thereby making it difficult to correct astigmatism by the surfaces $r_5$ and $r_7$. If $-r_6$ is smaller than 0.26f, the surface $r_6$ is nearly concentric with the point where the rays passing toward marginal portion of the image plane intersect with the optical axis, thereby aggravating spherical aberration though astigmatism and coma will be favorably corrected.

In the next place, it is required to correct coma in addition to astigmatism. The lens system according to the present invention is so designed as to select the radius of curvature $r_3$ as large as possible for minimizing coma and astigmatism and further correcting coma favorably by the surface $r_4$. For this purpose, the radii of curvature $r_3$ and $r_4$ are so selected as to satisfy the condition (8). If ratio of $|r_3|/r_4$ deviates from the range defined by the condition (8), coma and astigmatism produced by the surface $r_3$ will be so aggravated as not to be corrected.

Finally, in order to correct chromatic aberration, it is necessary to select Abbe's numbers of the first and second lens components so as to satisfy the condition (9) in addition to the conditions (4) and (5) which are already described above. The lens system according to the present invention is designed in such a manner that rays having different wavelengths will be at different heights on the respective surfaces of the first lens component but coincident in their heights on the image side surface $r_7$ of the third lens component. If $\nu_1 - \nu_2$ is smaller than 14 in the condition (9), it will be difficult to keep rays having different wavelengths at the same height on the surface $r_7$, thereby making it impossible to correct lateral chromatic aberration.

BRIEF DESCRIPTION OF THE DRAWINGS

FIG. 2 through FIG. 8 show curves illustrating the aberration characteristics of the Embodiments 1 through 7 of the present invention.

DETAILED DESCRIPTION OF THE PREFERRED EMBODIMENTS

Figure 1:
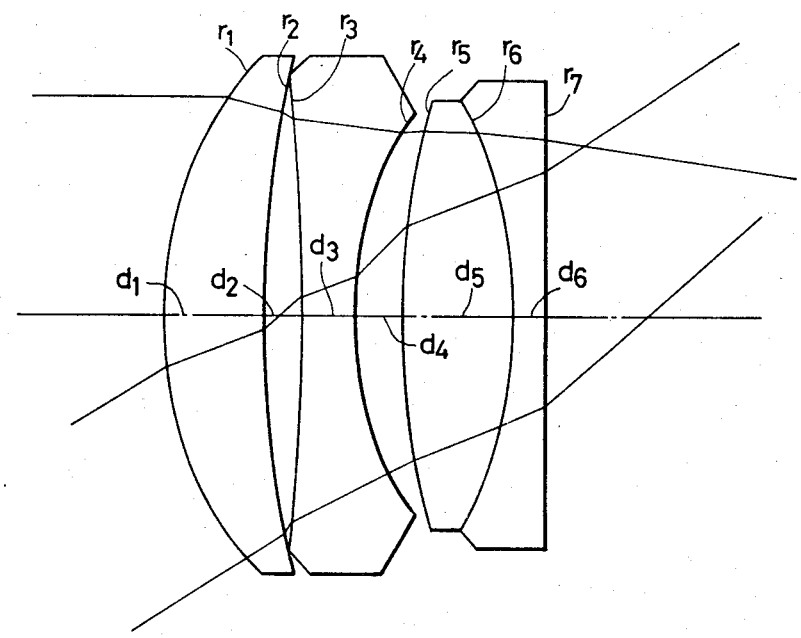
FIG. 1 shows a sectional view illustrating the composition of the photographic camera lens system according to the present invention.
Figure 2:
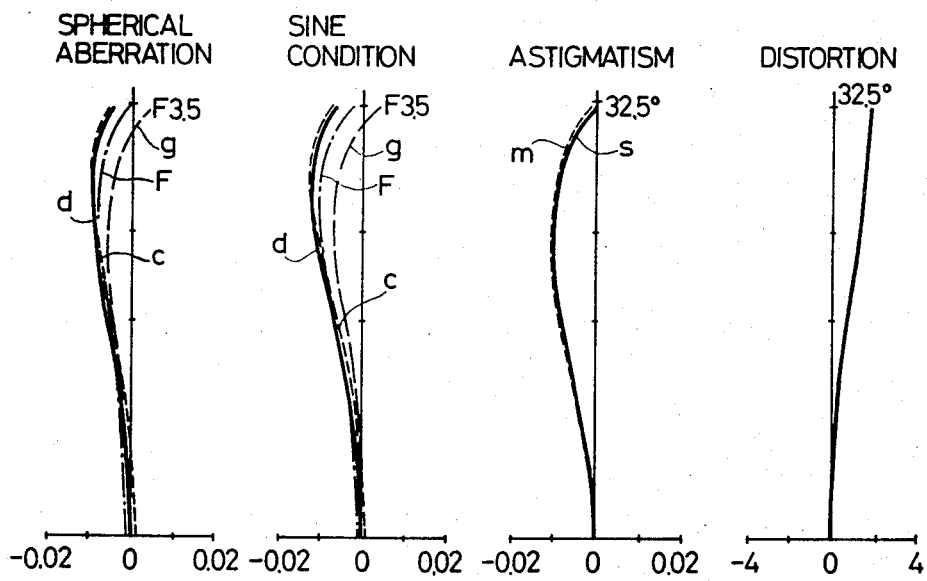
Figure 5:
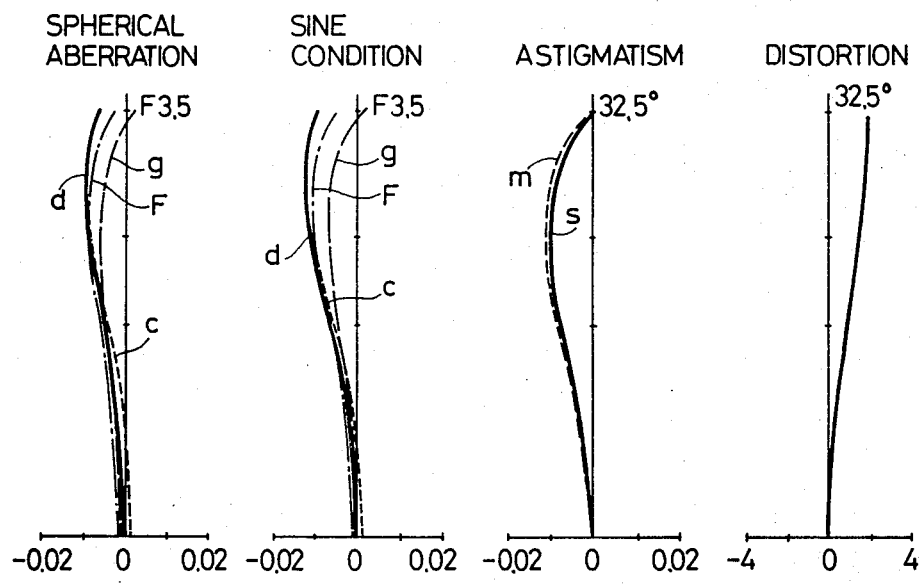
Figure 6:
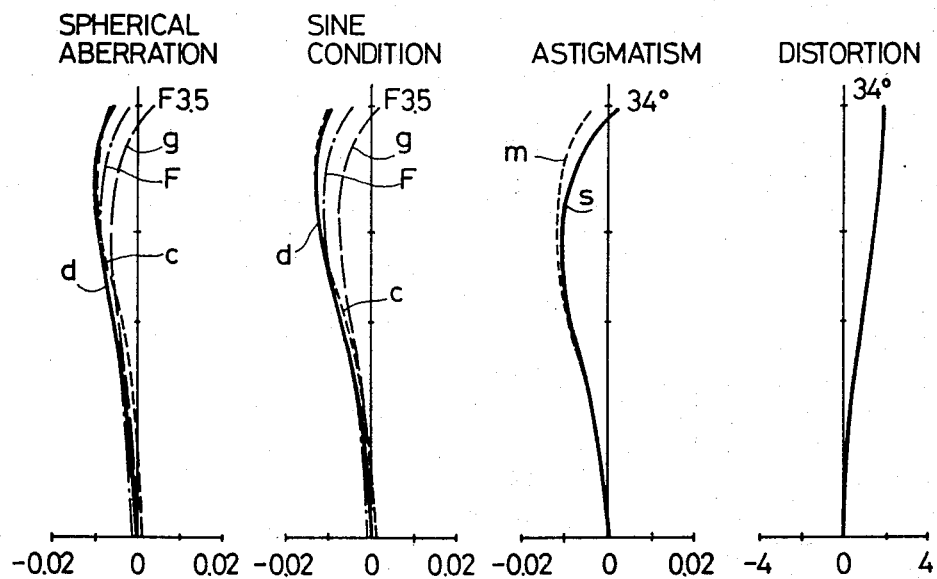
Figure 7:
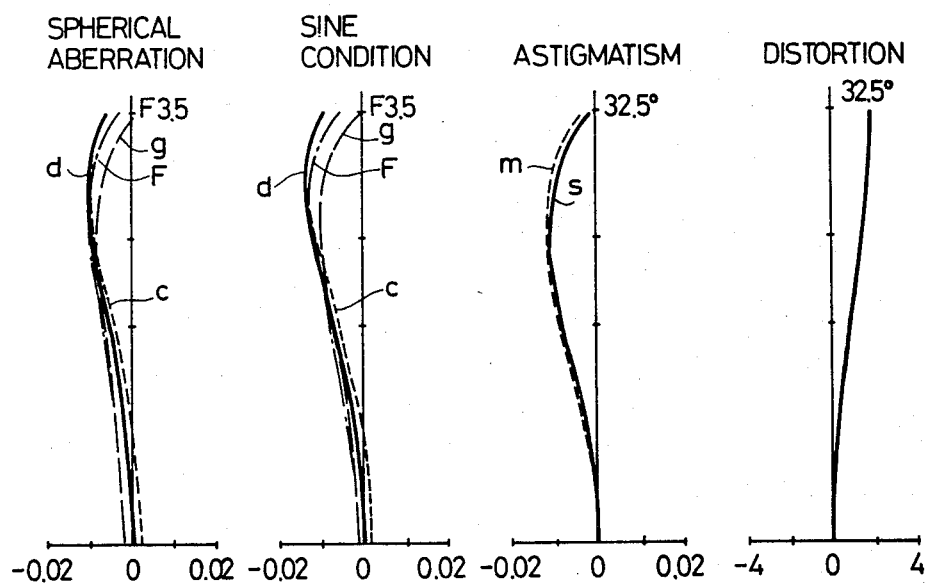
Figure 8:
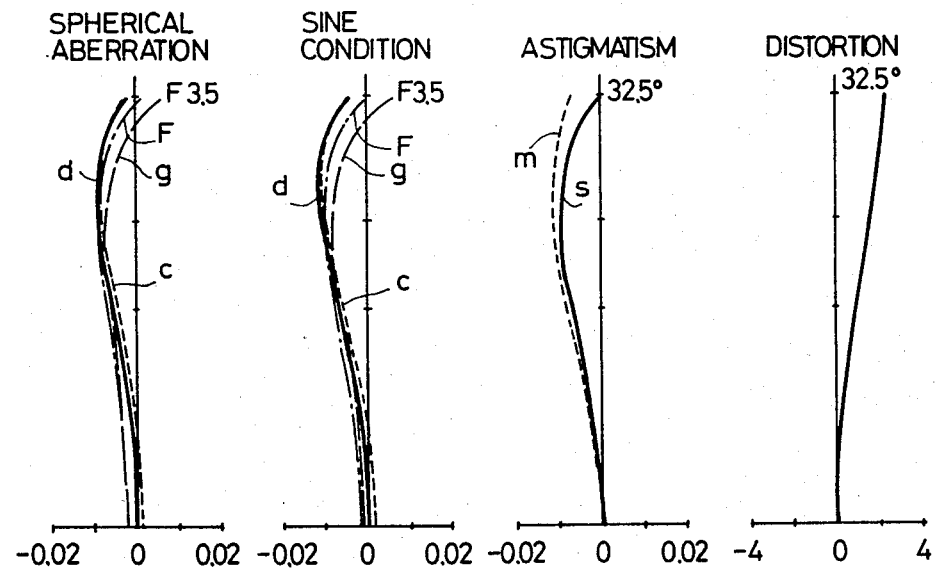

Now, some preferred embodiments of the photograhic camera lens system according to the present invention will be described detailedly below:

Embodiment 1

| | $f = 1.0$ | $F/3.5$ | $2\omega = 65°$ |
|---|---|---|---|
| $r_1 = 0.2706$ | | | |
| | $d_1 = 0.665$ | $n_1 = 1.7432$ | $\nu_1 = 49.41$ |
| $r_2 = 0.6699$ | | | |
| | $d_2 = 0.0268$ | | |
| $r_3 = -2.4418$ | | | |
| | $d_2 = 0.0379$ | $n_2 = 1.64769$ | $\nu_2 = 33.80$ |
| $r_4 = 0.2512$ | | | |
| | $d_4 = 0.0330$ | | |
| $r_5 = 0.5771$ | | | |
| | $d_5 = 0.0771$ | $n_3 = 1.713$ | $\nu_3 = 53.89$ |
| $r_6 = -0.3233$ | | | |
| | $d_6 = 0.0241$ | $n_4 = 1.51454$ | $\nu_4 = 54.69$ |
| $r_7 = -9.5575$ | | | |
| | $f_1 = 0.570,$ | $f_2 = -0.350$ | |

Embodiment 2

| | $f = 1.0$ | $F/3.5$ | $2\omega = 65°$ |
|---|---|---|---|
| $r_1 = 0.2713$ | | | |
| | $d_1 = 0.0652$ | $n_1 = 1.757$ | $\nu_1 = 47.87$ |
| $r_2 = 0.6668$ | | | |
| | $d_2 = 0.0250$ | | |
| $r_3 = -2.4513$ | | | |
| | $d_3 = 0.0365$ | $n_2 = 1.6668$ | $\nu_2 = 33.04$ |
| $r_4 = 0.2581$ | | | |
| | $d_4 = 0.0317$ | | |
| $r_5 = 0.6213$ | | | |
| | $d_5 = 0.0766$ | $n_3 = 1.735$ | $\nu_3 = 49.82$ |
| $r_6 = -0.3200$ | | | |
| | $d_6 = 0.0241$ | $n_4 = 1.5407$ | $\nu_4 = 47.20$ |
| $r_7 = -5.0209$ | | | |
| | $f_1 = 0.564,$ | $f_2 = -0.348$ | |

Embodiment 3

| | $f = 1.0$ | $F/3.5$ | $2\omega = 65°$ |
|---|---|---|---|
| $r_1 = 0.2754$ | | | |
| | $d_1 = 0.0664$ | $n_1 = 1.757$ | $\nu_1 = 47.87$ |
| $r_2 = 0.6949$ | | | |
| | $d_2 = 0.0268$ | | |
| $r_3 = -2.4583$ | | | |
| | $d_3 = 0.0379$ | $n_2 = 1.6668$ | $\nu_2 = 33.04$ |
| $r_4 = 0.2590$ | | | |
| | $d_4 = 0.0331$ | | |
| $r_5 = 0.6218$ | | | |
| | $d_5 = 0.0778$ | $n_3 = 1.735$ | $\nu_3 = 49.82$ |
| $r_6 = -0.3202$ | | | |
| | $d_6 = 0.0248$ | $n_4 = 1.5407$ | $\nu_4 = 47.20$ |
| $r_7 = -5.6510$ | | | |
| | $f_1 = 0.564,$ | $f_2 = -0.349$ | |

Embodiment 4

| | $f = 1.0$ | $F/3.5$ | $2\omega = 65°$ |
|---|---|---|---|
| $r_1 = 0.2779$ | | | |
| | $d_1 = 0.0672$ | $n_1 = 1.757$ | $\nu_1 = 47.87$ |
| $r_2 = 0.7134$ | | | |
| | $d_2 = 0.0281$ | | |
| $r_3 = -2.4998$ | | | |
| | $d_3 = 0.0389$ | $n_2 = 1.6668$ | $\nu_2 = 33.04$ |
| $r_4 = 0.2592$ | | | |
| | $d_4 = 0.0343$ | | |
| $r_5 = 0.6230$ | | | |
| | $d_5 = 0.0787$ | $n_3 = 1.735$ | $\nu_3 = 49.82$ |
| $r_6 = -0.3220$ | | | |
| | $d_6 = 0.0253$ | $n_4 = 1.5407$ | $\nu_4 = 47.20$ |
| $r_7 = -6.0291$ | | | |
| | $f_1 = 0.564,$ | $f_2 = -0.350$ | |

Embodiment 5

| | $f = 1.0$ | $F/3.5$ | $2\omega = 68°$ |
|---|---|---|---|
| $r_1 = 0.2715$ | | | |
| | $d_1 = 0.0716$ | $n_1 = 1.74320$ | $\nu_1 = 49.41$ |
| $r_2 = 0.6636$ | | | |
| | $d_2 = 0.0219$ | | |
| $r_3 = -2.3845$ | | | |
| | $d_3 = 0.0374$ | $n_2 = 1.64769$ | $\nu_2 = 33.80$ |
| $r_4 = 0.2558$ | | | |
| | $d_4 = 0.0316$ | | |
| $r_5 = 0.6060$ | | | |
| | $d_5 = 0.0779$ | $n_3 = 1.713$ | $\nu_3 = 53.89$ |
| $r_6 = -0.3307$ | | | |
| | $d_6 = 0.0250$ | $n_4 = 1.51451$ | $\nu_4 = 54.69$ |
| $r_7 = -4.9283$ | | | |
| | $f_1 = 0.574,$ | $f_2 = -0.355$ | |

Embodiment 6

| | $f = 1.0$ | $F/3.5$ | $2\omega = 65°$ |
|---|---|---|---|
| $r_1 = 0.2734$ | | | |
| | $d_1 = 0.0716$ | $n_1 = 1.74320$ | $\nu_1 = 49.41$ |

-continued

| | | | | |
|---|---|---|---|---|
| $r_2 = 0.6849$ | | | | |
| | $d_2 = 0.0220$ | | | |
| $r_3 = -2.2708$ | | | | |
| | $d_3 = 0.0376$ | $n_2 = 1.64769$ | $\nu_2 = 33.80$ | |
| $r_4 = 0.2561$ | | | | |
| | $d_4 = 0.0318$ | | | |
| $r_5 = 0.6077$ | | | | |
| | $d_5 = 0.0781$ | $n_3 = 1.713$ | $\nu_3 = 53.89$ | |
| $r_6 = -0.3183$ | | | | |
| | $d_6 = 0.0250$ | $n_4 = 1.51823$ | $\nu_4 = 58.96$ | |
| $r_7 = -5.4917$ | | | | |
| | $f_1 = 0.570,$ | $f_2 = -0.353$ | | |

Embodiment 7

| | $f = 1.0$ | F/3.5 | $2\omega = 65°$ |
|---|---|---|---|
| $r_1 = 0.2669$ | | | |
| | $d_1 = 0.0703$ | $n_1 = 1.7432$ | $\nu_1 = 49.41$ |
| $r_2 = 0.6460$ | | | |
| | $d_2 = 0.0216$ | | |
| $r_3 = -2.4561$ | | | |
| | $d_3 = 0.0397$ | $n_2 = 1.64769$ | $\nu_2 = 33.80$ |
| $r_4 = 0.2468$ | | | |
| | $d_4 = 0.0303$ | | |
| $r_5 = 0.5589$ | | | |
| | $d_5 = 0.0731$ | $n_3 = 1.713$ | $\nu_3 = 53.89$ |
| $r_6 = -0.3148$ | | | |
| | $d_6 = 0.0213$ | $n_4 = 1.51823$ | $\nu_4 = 58.96$ |
| $r_7 = -12.9131$ | | | |
| | $f_1 = 0.567,$ | $f_2 = -0.344$ | | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

I claim:

1. A behind-stop type lens system for photographic cameras comprising a first positive meniscus lens component having a convex surface on the object side, a second biconcave lens component and a third cemented doublet component consisting of a biconvex lens element and a negative lens element, and said lens system satisfying the conditions enumerated hereunder:

(1) $0.23f < \Sigma d < 0.28f$
(2) $0.55 < f_1 < 0.59f$
(3) $-0.37f < f_2 < -0.32f$
(4) $n_1 > 1.71$
(5) $n_2 < 1.67$
(6) $|r_7| > 4.8f$
(7) $0.26f < -r_6 < 0.34f$
(8) $|r_3|/r_4 > 6.0$
(9) $\nu_1 - \nu_2 > 14$ wherein the reference symbol $\Sigma d$ represents total length of said lens system as a whole, the reference symbols $f_1$, $f_2$ and f designate focal lengths of the first, second lens components and the lens system as a whole respectively, the reference symbols $n_1$ and $n_2$ denote refractive indices of the first and second lens components respectively, the reference symbols $r_3$ and $r_4$ represent radii of curvature on the respective surfaces of the second lens component, the reference symbols $r_6$ and $r_7$ designate radii of curvature on the cemented surface and image side surface respectively of the third lens component and the reference symbols $\nu_1$ and $\nu_2$ denote Abbe's numbers of the first and second lens components respectively.

2. A behind-stop type lens system for photographic cameras according to claim 1 having the following numerical data:

| | $f = 1.0$ | F/3.5 | $2\omega = 65°$ |
|---|---|---|---|
| $r_1 = 0.2706$ | | | |
| | $d_1 = 0.665$ | $n_1 = 1.7432$ | $\nu_1 = 49.41$ |
| $r_2 = 0.6699$ | | | |
| | $d_2 = 0.0268$ | | |
| $r_3 = -2.4418$ | | | |
| | $d_2 = 0.0379$ | $n_2 = 1.64769$ | $\nu_2 = 33.80$ |
| $r_4 = 0.2512$ | | | |
| | $d_4 = 0.0330$ | | |
| $r_5 = 0.5771$ | | | |
| | $d_5 = 0.0771$ | $n_3 = 1.713$ | $\nu_3 = 53.89$ |
| $r_6 = -0.3233$ | | | |
| | $d_6 = 0.0241$ | $n_4 = 1.51454$ | $\nu_4 = 54.69$ |
| $r_7 = -9.5575$ | | | |
| | $f_1 = 0.570,$ | $f_2 = -0.350$ | | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

3. A behind-stop type lens system for photographic cameras according to claim 1 having the following numerical data:

| | $f = 1.0$ | F/3.5 | $2\omega = 65°$ |
|---|---|---|---|
| $r_1 = 0.2713$ | | | |
| | $d_1 = 0.0652$ | $n_1 = 1.757$ | $\nu_1 = 47.87$ |
| $r_2 = 0.6668$ | | | |
| | $d_2 = 0.0250$ | | |
| $r_3 = -2.4513$ | | | |
| | $d_3 = 0.0365$ | $n_2 = 1.6668$ | $\nu_2 = 33.04$ |
| $r_4 = 0.2581$ | | | |
| | $d_4 = 0.0317$ | | |
| $r_5 = 0.6213$ | | | |
| | $d_5 = 0.0766$ | $n_3 = 1.735$ | $\nu_3 = 49.82$ |
| $r_6 = -0.3200$ | | | |
| | $d_6 = 0.0241$ | $n_4 = 1.5407$ | $\nu_4 = 47.20$ |
| $r_7 = -5.0209$ | | | |
| | $f_1 = 0.564,$ | $f_2 = -0.348$ | | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

4. A behind-stop type lens system for photographic cameras according to claim 1 having the following numerical data:

| | $f = 1.0$ | F/3.5 | $2\omega = 65°$ |
|---|---|---|---|
| $r_1 = 0.2754$ | | | |
| | $d_1 = 0.0664$ | $n_1 = 1.757$ | $\nu_1 = 47.87$ |
| $r_2 = 0.6949$ | | | |
| | $d_2 = 0.0268$ | | |
| $r_3 = -2.4583$ | | | |
| | $d_3 = 0.0379$ | $n_2 = 1.6668$ | $\nu_2 = 33.04$ |
| $r_4 = 0.2590$ | | | |
| | $d_4 = 0.0331$ | | |
| $r_5 = 0.6218$ | | | |
| | $d_5 = 0.0778$ | $n_3 = 1.735$ | $\nu_3 = 49.82$ |
| $r_6 = -0.3202$ | | | |
| | $d_6 = 0.0248$ | $n_4 = 1.5407$ | $\nu_4 = 47.20$ |

-continued $r_7 = -5.6510$
$f_1 = 0.564,\quad f_2 = -0.349$ wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

5. A behind-stop type lens system for photographic cameras according to claim 1 having the following numerical data:

|  | $f = 1.0$ | F/3.5 | $2\omega = 65°$ |  |
|---|---|---|---|---|
| $r_1 = 0.2779$ |  |  |  |  |
|  | $d_1 = 0.0672$ | $n_1 = 1.757$ |  | $\nu_1 = 47.87$ |
| $r_2 = 0.7134$ |  |  |  |  |
|  | $d_2 = 0.0281$ |  |  |  |
| $r_3 = -2.4998$ |  |  |  |  |
|  | $d_3 = 0.0389$ | $n_2 = 1.6668$ |  | $\nu_2 = 33.04$ |
| $r_4 = 0.2592$ |  |  |  |  |
|  | $d_4 = 0.0343$ |  |  |  |
| $r_5 = 0.6230$ |  |  |  |  |
|  | $d_5 = 0.0787$ | $n_3 = 1.735$ |  | $\nu_3 = 49.82$ |
| $r_6 = -0.3220$ |  |  |  |  |
|  | $d_6 = 0.0253$ | $n_4 = 1.5407$ |  | $\nu_4 = 47.20$ |
| $r_7 = -6.0291$ |  |  |  |  |
|  | $f_1 = 0.564,$ | $f_2 = -0.350$ |  |  | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

6. A behind-stop type lens system for photographic cameras according to claim 1 having the following numerical data:

|  | $f = 1.0$ | F/3.5 | $2\omega = 68°$ |  |
|---|---|---|---|---|
| $r_1 = 0.2715$ |  |  |  |  |
|  | $d_1 = 0.0716$ | $n_1 = 1.74320$ |  | $\nu_1 = 49.41$ |
| $r_2 = 0.6636$ |  |  |  |  |
|  | $d_2 = 0.0219$ |  |  |  |
| $r_3 = -2.3845$ |  |  |  |  |
|  | $d_3 = 0.0374$ | $n_2 = 1.64769$ |  | $\nu_2 = 33.80$ |
| $r_4 = 0.2558$ |  |  |  |  |
|  | $d_4 = 0.0316$ |  |  |  |
| $r_5 = 0.6060$ |  |  |  |  |
|  | $d_5 = 0.0779$ | $n_3 = 1.713$ |  | $\nu_3 = 53.89$ |
| $r_6 = -0.3307$ |  |  |  |  |
|  | $d_6 = 0.0250$ | $n_4 = 1.51451$ |  | $\nu_4 = 54.69$ |
| $r_7 = -4.9283$ |  |  |  |  |
|  | $f_1 = 0.574,$ | $f_2 = -0.355$ |  |  | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

7. A behind-stop type lens system for photographic cameras according to claim 1 having the following numerical data:

|  | $f = 1.0$ | F/3.5 | $2\omega = 65°$ |  |
|---|---|---|---|---|
| $r_1 = 0.2734$ |  |  |  |  |
|  | $d_1 = 0.0716$ | $n_1 = 1.74320$ |  | $\nu_1 = 49.41$ |
| $r_2 = 0.6849$ |  |  |  |  |
|  | $d_2 = 0.0220$ |  |  |  |
| $r_3 = -2.2708$ |  |  |  |  |
|  | $d_3 = 0.0376$ | $n_2 = 1.64769$ |  | $\nu_2 = 33.80$ |
| $r_4 = 0.2561$ |  |  |  |  |
|  | $d_4 = 0.0318$ |  |  |  |
| $r_5 = 0.6077$ |  |  |  |  |
|  | $d_5 = 0.0781$ | $n_3 = 1.713$ |  | $\nu_3 = 53.89$ |
| $r_6 = -0.3183$ |  |  |  |  |
|  | $d_6 = 0.0250$ | $n_4 = 1.51823$ |  | $\nu_4 = 58.96$ |
| $r_7 = -5.4917$ |  |  |  |  |
|  | $f_1 = 0.570,$ | $f_2 = -0.353$ |  |  | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

8. A behind-stop type lens system for photographic cameras according to claim 1 having the following numerical data:

|  | $f = 1.0$ | F/3.5 | $2\omega = 65°$ |  |
|---|---|---|---|---|
| $r_1 = 0.2669$ |  |  |  |  |
|  | $d_1 = 0.0703$ | $n_1 = 1.7432$ |  | $\nu_1 = 49.41$ |
| $r_2 = 0.6460$ |  |  |  |  |
|  | $d_2 = 0.0216$ |  |  |  |
| $r_3 = -2.4561$ |  |  |  |  |
|  | $d_3 = 0.0397$ | $n_2 = 1.64769$ |  | $\nu_2 = 33.80$ |
| $r_4 = 0.2468$ |  |  |  |  |
|  | $d_4 = 0.0303$ |  |  |  |
| $r_5 = 0.5589$ |  |  |  |  |
|  | $d_5 = 0.0731$ | $n_3 = 1.713$ |  | $\nu_3 = 53.89$ |
| $r_6 = -0.3148$ |  |  |  |  |
|  | $d_6 = 0.0213$ | $n_4 = 1.51823$ |  | $\nu_4 = 58.96$ |
| $r_7 = -12.9131$ |  |  |  |  |
|  | $f_1 = 0.567,$ | $f_2 = -0.344$ |  |  | wherein the reference symbols $r_1$ through $r_7$ represent radii of curvature on the respective surfaces of the lens elements, the reference symbols $d_1$ through $d_6$ designate thicknesses of the respective lens elements and airspaces therebetween, the reference symbols $n_1$ through $n_4$ denote refractive indices of the respective lens elements and the reference symbols $\nu_1$ through $\nu_4$ represent Abbe's numbers of the respective lens elements.

* * * * *